United States Patent
Rottner et al.

(10) Patent No.: US 8,396,653 B2
(45) Date of Patent: Mar. 12, 2013

(54) DYNAMIC RANGE DISPLAY FOR AUTOMOTIVE REAR-VIEW AND PARKING SYSTEMS

(75) Inventors: Gunter Rottner, Wixom, MI (US); Jeffrey Bochenek, Milford, MI (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 12/704,853

(22) Filed: Feb. 12, 2010

(65) Prior Publication Data

US 2011/0202240 A1 Aug. 18, 2011

(51) Int. Cl.
*G06F 7/00* (2006.01)
*G06F 17/10* (2006.01)

(52) U.S. Cl. .......... 701/300; 340/435; 340/436

(58) Field of Classification Search .......... 701/28, 701/36, 41, 42, 116, 211, 216, 223, 300, 701/301, 302; 340/435, 436, 437, 932.2, 340/933, 935, 937; 348/113, 118, 119, 148, 348/207.99, 208.14, 208.15; 382/106

See application file for complete search history.

(56) References Cited

U.S. PATENT DOCUMENTS

| | | | |
|---|---|---|---|
| 5,646,614 A | 7/1997 | Abersfelder et al. | |
| 5,949,331 A | 9/1999 | Schofield et al. | |
| 6,564,122 B1 | 5/2003 | Huertgen et al. | |
| 6,919,917 B1 | 7/2005 | Janssen | |
| 6,989,739 B2 | 1/2006 | Li | |
| 7,257,486 B2 * | 8/2007 | Shimazaki et al. | 701/300 |
| 7,366,595 B1 * | 4/2008 | Shimizu et al. | 701/301 |
| 7,379,564 B2 * | 5/2008 | Kakinami et al. | 382/104 |
| 7,432,799 B2 | 10/2008 | Tsuboi | |
| 7,640,107 B2 * | 12/2009 | Shimizu et al. | 701/216 |
| 7,640,108 B2 * | 12/2009 | Shimizu et al. | 701/301 |
| 7,881,496 B2 * | 2/2011 | Camilleri et al. | 382/104 |
| 2006/0125919 A1 | 6/2006 | Camilleri et al. | |
| 2006/0287826 A1 * | 12/2006 | Shimizu et al. | 701/216 |
| 2007/0273554 A1 * | 11/2007 | Sakakibara | 340/932.2 |
| 2008/0122654 A1 * | 5/2008 | Sakakibara | 340/932.2 |
| 2008/0231701 A1 | 9/2008 | Greenwood et al. | |
| 2009/0059006 A1 | 3/2009 | Hattori et al. | |
| 2009/0096937 A1 | 4/2009 | Bauer et al. | |
| 2010/0241289 A1 * | 9/2010 | Sandberg | 701/2 |
| 2011/0122249 A1 * | 5/2011 | Camilleri et al. | 348/148 |

OTHER PUBLICATIONS

Carpages, "Audi A4 Parking System (APS)" from http://www.carpages.co.uk/audi/audi-a4-parking-system-09-02-08.asp (Oct. 12, 2009) 2 pages.

\* cited by examiner

*Primary Examiner* — John Q Nguyen
*Assistant Examiner* — Michael Whalen
(74) *Attorney, Agent, or Firm* — Michael Best & Friedrich LLP

(57) ABSTRACT

A dynamic range display system for a vehicle. The system includes a camera, a distance sensor, a display, and a controller. The camera is configured to capture an image and to generate a signal representative of the image. The distance sensor is configured to detect an object of interest within a path of the vehicle and to generate a signal that identifies a distance between the vehicle and the object of interest. The display is configured to provide a visual image, and the controller is configured to receive the signal from the camera and the signal from the distance sensor. The controller generates an image on the display representing the image detected by the camera and a dynamic vehicle path line overlaid over the camera image. The dynamic vehicle path line provides an indication of a distance between the vehicle and the object of interest.

13 Claims, 3 Drawing Sheets

DYNAMIC RANGE DISPLAY FOR AUTOMOTIVE REAR-VIEW AND PARKING SYSTEMS

FIELD OF THE INVENTION

The present invention relates to systems and methods for assisting an operator of a vehicle in determining a distance between the vehicle and an object.

BACKGROUND

Current back-up or reverse systems in automobiles include sensors that alert the driver of objects that are in the vehicle's backing path (e.g., a person, another vehicle, a shopping cart, etc.). The technologies most often used today consist of either image sensors (e.g., CCD or CMOS-based cameras) or distance sensors (ultrasonic, radar, active IR, passive IR) that calculate the distance from the rear of the vehicle to the object of interest.

Distance-sensing technologies typically indicate distance using audible cues, visual displays, or both. The audible cue is usually a beeping tone that increases in rate as the vehicle (in particular, the vehicle's bumper) gets closer to the object of interest. The beep becomes a solid tone when the object is very close to the vehicle (e.g., less than twelve inches). Visual displays typically include a varying numbers of LED's. As the object gets closer to the bumper, more LED's are illuminated. When the object is very close to the bumper, all of the LED's are illuminated and often will flash on/off.

Image sensing technologies utilize images captured by a camera (or similar device). The images are displayed on a liquid crystal display ("LCD") or similar display either in the center stack of the instrument panel, in the instrument cluster, or in the rear-view mirror. Additional information can be added to the displayed image (or specifically, lines that represent a track (or path) that the vehicle is traveling, while in reverse, are added to the viewable output. In addition to the vehicle track, some displays also show a center line between the vehicle track lines to aid a driver trying to hitch a trailer to a host vehicle. A more recent update to the vehicle track overlay is to show the track the vehicle will take, based on a position of the steering wheel, assuming the steering wheel remains in its current position).

SUMMARY

Both types of technologies (i.e., distance and image) have certain strengths in alerting the driver of a potential object in the vehicle's path. However, users can have difficulty in accurately gauging the distance between the rear of the vehicle and an object based on the cues provided by distance systems. The audible cues or the lit LEDs provide a sense of how the distance is changing but are difficult to translate into what the remaining distance is between the vehicle and the object is.

Likewise, image systems do not provide a driver with a satisfactory perspective of how close an object is to the rear of the vehicle. Because of distortion that is inherent in automotive camera lenses, the perceived depth of an object changes quickly as the object moves through the camera's field of view. This is different than the manner in which the human eye normally perceives changes in distance. Thus, a driver can be confused as to how close the vehicle is to an object, especially when the object fills the entire field of view (e.g., a wall of a building or the front, rear, or side of a parked vehicle).

To address the issues identified above, the inventors have developed a visual assist that improves a driver's perception of the distance between the driver's vehicle and an object. In one embodiment a dynamic range display system for a vehicle is provided. The system includes a camera, a distance sensor, a display, and a controller. The camera is configured to capture an image and to generate a first signal (or group of signals) representative of the image. The distance sensor is configured to detect an object of interest within a path of the vehicle and to generate a second signal. The second signal identifies (or is representative of) a distance between the vehicle and the object of interest. The display is configured to provide a visual image, and the controller is configured to receive the first signal from the camera and the second signal from the distance sensor. The controller generates an image on the display representing the image detected by the camera and a dynamic vehicle path line overlaid over the camera image. The dynamic vehicle path line provides an indication of a distance between the vehicle and the object of interest.

Another embodiment provides a method of assisting an operator of a vehicle in determining a distance between the vehicle and an object of interest. The method includes the acts of displaying an image representative of a field of view from the vehicle, detecting the object of interest in the field of view, overlaying a dynamic vehicle path line on the displayed image, and adjusting the dynamic vehicle path line based on a distance between the vehicle and the object of interest so that the dynamic vehicle path line does not overlay the image of the object of interest.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
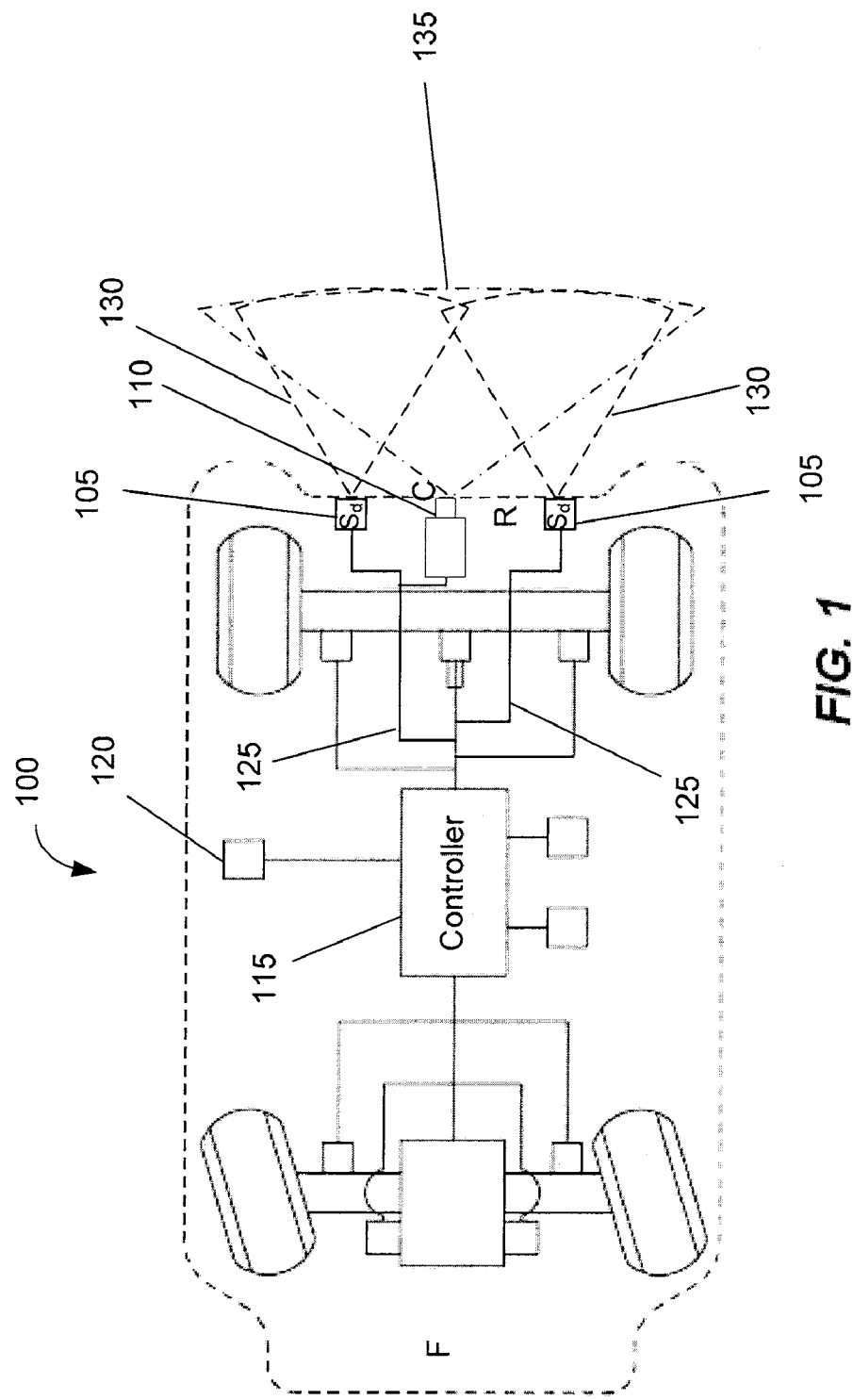
FIG. 1 is a schematic illustration of an automobile incorporating an embodiment of the invention.

FIG. 1 shows an automobile 100 including one or more distance sensors 105 (e.g., ultrasonic sensors), a camera 110 (e.g., a CCD device), a controller 115, and a display 120. The distance sensors 105 and camera 110 are coupled to the controller 115 via a bus 125 (e.g., a controller area network or CAN bus). In some embodiments, the distance sensors 105 and/or camera 110 can be coupled to the controller 115 via direct connections or other suitable communications connections. The controller 115 can be coupled to other components of the automobile 100 such as wheel speed sensors, yaw rate sensors, etc., or can be a "stand-alone" controller.

In the embodiment shown, the distance sensors 105 are mounted at the rear (R) of the automobile 100 in order to detect the distance to objects located behind and in the path of the automobile 100 when it is traveling in reverse. The distance sensors 105 project a signal 130 in a generally cone-shaped region. When the signal 130 hits an object, the signal is reflected back to the sensor 105. Based on the time from when the distance sensor 105 sends the signal 130 to the time sensor 105 receives the reflected signal 130 back, the sensor 105 can determine the distance to the object by performing a "time of flight calculation." Although ultrasonic sensors are described, other types of distance sensors that operate in different ways (e.g., a sensor that senses distance information without performing a time of flight calculation) can be used. The distance sensors 105 provide an indication or output to the controller 115 of the distance from the rear of the automobile 100 to one or more objects located behind the automobile 100. The frequency at which the output is provided by the distance sensors 105 to the controller 115 can be continuous, timed, or can vary (e.g., based on the speed and/or direction of the automobile 100). In some embodiments, the output is provided in response to a request from the controller 115 (e.g., polling).

The camera 110 receives light reflected from objects behind the automobile 100, and converts the light into a signal indicative of the image in the camera's field of view 135. In some embodiments, the camera 110 provides the signal to the controller 115 continuously. In other embodiments, the camera 110 provides updated images to the controller 115 on a periodic basis. The signal the camera 110 provides to the controller 115 can be an analog or a digital signal. In one embodiment, the signal conforms to a standard protocol or format (e.g., NTSC). Alternatively, a proprietary protocol or format is used.

The display 120 can be an LCD, CRT, or other suitable display capable of displaying an image. The display 120 is positioned such that an operator of the automobile 100 is able to view the image displayed on the display 120 (e.g., on a dashboard of the automobile 100, in a mirror of the automobile 100, etc.).

The controller 115 uses the information received from the distance sensors 105 to dynamically generate what are referred to as "visual assists." The visual assists are overlaid on the image generated by the camera 110, and the combination of the image and one or more visual assists are displayed on the display 120. The visual assists help the operator visualize the distance between the vehicle 100 and any objects of interest (e.g., objects in the path of the vehicle 100).

Figure 2:
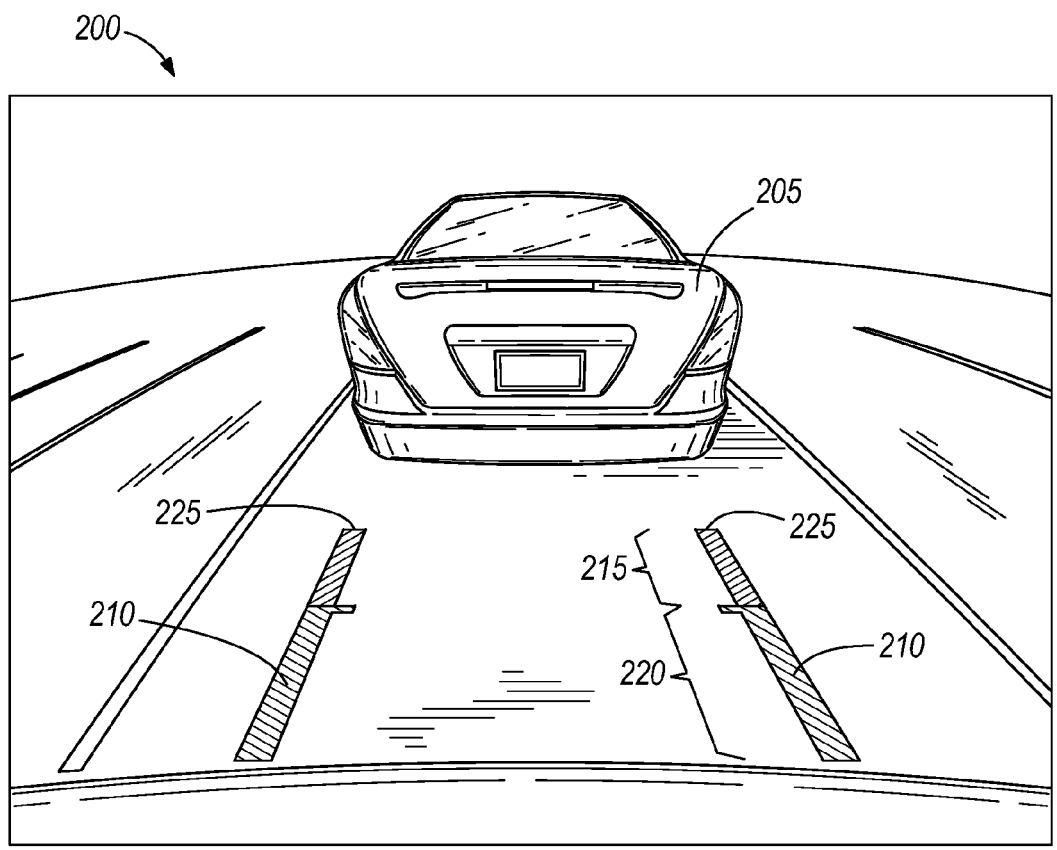
FIG. 2 is an exemplary display illustrating an embodiment of a visual assist for helping an operator to determine a distance from the operator's vehicle to an object.

FIG. 2 shows an embodiment of a visual assist for helping an operator visualize the distance between the vehicle 100 and objects in the vehicle's path. The display 120 shows a visual image 200 generated by the camera 110. The image 200 shown includes a first vehicle 205 in the path of the vehicle 100. Because the first vehicle 205 is in the path of the vehicle 100, it is an object of interest. The controller 115 produces a pair of dynamic vehicle path lines 210 as a visual assist to the operator of the vehicle 100, overlaying the dynamic vehicle path lines 210 over the image captured by the camera 110. The controller 115 displays the dynamic vehicle path lines 210 such that the lines 210 appear to be positioned on the ground behind the vehicle 100. The dynamic vehicle path lines 210 provide a visual indication of the path the vehicle will take based upon the present position of a steering wheel (e.g., obtained from a steering angle sensor). In the image shown in FIG. 2, the dynamic vehicle path lines 210 are shown for the vehicle 100 backing up straight. In addition, as the vehicle 100 approaches the object of interest 205, the dynamic vehicle path lines 210 become shorter in length to provide a visual indication to the operator of the distance between the vehicle 100 and the object of interest 205. In some embodiments, the dynamic vehicle path lines 210 can be shown in two or more colors. A first portion 215 of the lines 210 (e.g., the portion closest to the object of interest 205) is a first color (e.g., yellow). A second portion 220 of the lines 210 (e.g., the portion closest to the vehicle 100) is a second color (e.g., red). The length of each portion 215 and 220 represents a distance. In some embodiments, the first and second portions have maximum lengths that are equal. In other embodiments, one portion has a maximum length that is greater than the maximum length of the other portion. When the object of interest 205 is beyond a total distance represented by the first portion 215 and a distance represented by the second portion 220, each portion is shown at its maximum length (e.g., a first size).

As the vehicle 100 approaches the object of interest 205, an end 225 of the first portion 215 becomes closer to the object of interest 205. Once the vehicle 100 is close enough to the object of interest 205 that the end 225 would appear to be in the object of interest 205 (e.g., the vehicle 100 is a first predetermined distance from the object 205), the controller 115 reduces the length of the first portion 215 that is displayed, giving the operator an indication of how close the vehicle 100 is to the object of interest 205. As the vehicle 100 continues to close the distance between itself and the object of interest 205, the first portion 215 continues to shorten. That is, the sum of the length of the first portion 215 and the length of the second portion 225 is proportionate to the distance between the vehicle 100 and the object 205 compared to the first predetermined distance. Once the entire first portion 215 is no longer visible (i.e., disappears), the second portion 225 begins to shorten until the vehicle 100 is close enough to the object of interest 205 that all of the dynamic vehicle path lines 210 are gone (i.e., the lines 210 have disappeared). Additional indications that the vehicle 100 is extremely close to the object of interest 205 can be provided such as flashing of the image 200, flashing a symbol on the image 200, or an audible alarm.

Figure 3B:
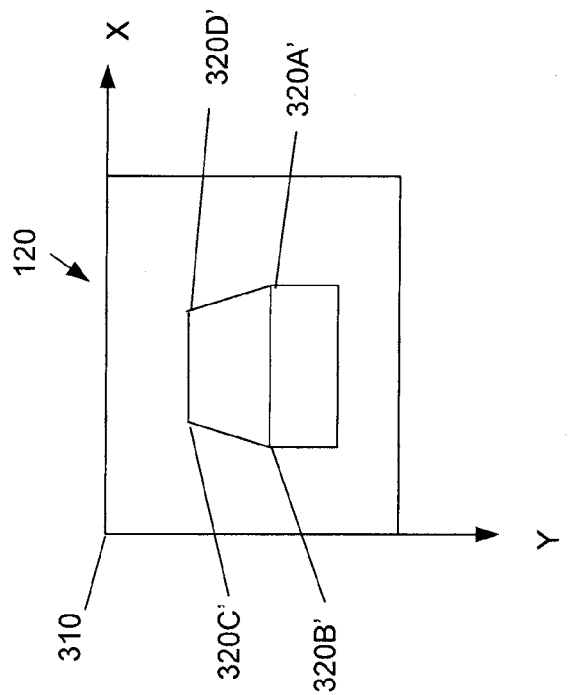
FIG. 3B is an illustration of the relationships between objects on a display during a calibration of a visual assist.
Figure 3A:
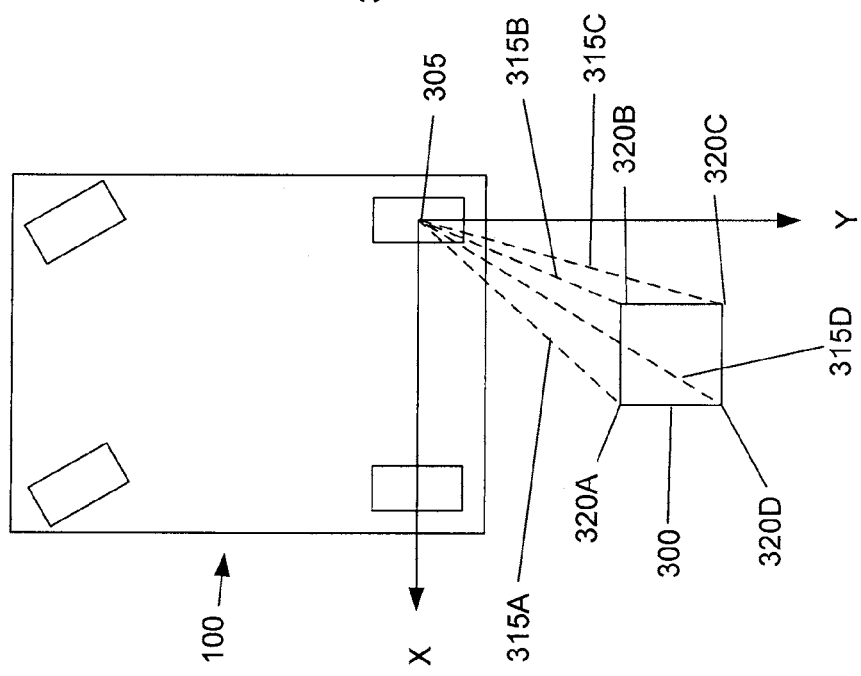
FIG. 3A is an illustration of the relationships between objects during a calibration of a visual assist.

FIGS. 3A and 3B illustrate an embodiment of a calibration process for the visual assist. The visual assist is calibrated so that the lines 210 appear in the image to be positioned on the ground, and so that the lines disappear prior to appearing to be imbedded in the object of interest. A rectangular object 300 is placed behind the vehicle 100 in the camera's 110 field of view. The right rear wheel of the vehicle 100 is used as a coordinate origin 305 with the x-axis extending toward the left rear wheel of the vehicle 100 and the y-axis extending rearward from the vehicle. For the display, the upper left corner is used as the display coordinate origin 310 with the x-axis extending to the right and the y-axis extending down. The distances 315A, 315B, 315C, and 315D from the coordinate origin 305 to each of four corners 320A, 320B, 320C, and 320D of the rectangular object 300 are measured. Next, the locations 320A', 320B', 320C', and 320D' of the four corners 320A, 320B, 320C, and 320D of the rectangular object 300 on the display 120 are identified (e.g., using a touch screen or an overlaid grid). Using the physical measurements of the distances 315A, 315B, 315C, and 315D to the four corners 320A, 320B, 320C, and 320D of the rectangular object 300 and the locations 320A', 320B', 320C', and 320D' of the four corners 320A, 320B, 320C, and 320D of the rectangular object 300 on the display 120, a homography matrix is calculated.

After the homography matrix is calculated, the controller 115 uses the known distances to the rear bumper of the vehicle 100 and the detected distances to the object of interest, to determine where on the display 120 to display the lines 210 and what the length of the lines 210 should be.

In some embodiments, the controller and the camera can be combined into a single unit. The camera then receives signals from the distance sensors, and produces an image including any visual assists.

In the embodiment shown, visual assists are provided for objects of interest in the path of the vehicle. However, other visual assists can be provided that identify objects that are outside the present path of the vehicle, but close enough that they could collide with the vehicle if the vehicle's path changed.

In the embodiment shown, the invention is described as being positioned at the rear of a four-wheeled automobile. However, the invention has applicability to other vehicles where the operator of the vehicle cannot see all of the objects that may be in the path of the vehicle. For example, additional embodiments of the invention are contemplated for use with trucks, buses (including school buses), airplanes, cranes, construction equipment, fork lifts, etc. The invention is also contemplated as being placed in different positions such as the front of a vehicle, in blind spots of a vehicle, underneath a vehicle (e.g., a large plane), on the wings of a plane, etc.

In another embodiment, a visual assist is provided to guide a ball of a trailer hitch to a receiver on a trailer. The visual assist provides a directional and distance guide to an operator assisting the operator in positioning the ball at the receiver.

Thus, the invention provides, among other things, a system for assisting an operator in determining how close an object of interest is to a vehicle.

What is claimed is:

1. A dynamic range display system for a vehicle, the system comprising:
    a camera configured to capture an image and to generate a first signal representative of the image;
    a distance sensor configured to detect an object of interest with which the vehicle may collide within a path of the vehicle and to generate a second signal representative of a distance between the vehicle and the object of interest;
    a display configured to provide a visual image; and
    a controller configured to receive the first signal from the camera and the second signal from the distance sensor, the controller generating an image on the display representing the image detected by the camera and generating a dynamic vehicle path line, the controller overlaying the dynamic vehicle path line over the image detected by the camera;
    wherein the dynamic vehicle path line shows a projected path of the vehicle and has a first length when the vehicle is greater than a first predetermined distance away from the object of interest with which the vehicle may collide, and wherein the length varies linearly from the first length to zero based on a proportion of the distance the vehicle is away from the object of interest with which the vehicle may collide versus the first predetermined distance; wherein the dynamic vehicle path line has a first portion and a second portion, the first portion having a first color and the second portion having a second color different from the first color.

2. The system of claim 1, wherein the projected path is determined based on an indication received from a steering angle sensor.

3. The system of claim 1, further comprising an audible alarm, the audible alarm sounding when the distance between the vehicle and the object of interest with which the vehicle may collide is less than a second predetermined distance, the dynamic vehicle path line disappearing when the distance is less than the second predetermined distance.

4. The system of claim 1, wherein the dynamic vehicle path line is positioned in the visual image next to a back bumper of the vehicle.

5. The system of claim 1, wherein the first portion has a first length and the second portion has a second length when the vehicle is greater than a first predetermined distance away from the object of interest with which the vehicle may collide.

6. The system of claim 5, wherein the length of the first portion is dynamically reduced from the first length as the vehicle moves closer than the first predetermined distance to the object of interest with which the vehicle may collide, the first portion disappearing when the vehicle is closer than a second predetermined distance to the object of interest with which the vehicle may collide.

7. The system of claim 6, wherein the length of the second portion is dynamically reduced as the vehicle moves closer than the second predetermined distance to the object of interest with which the vehicle may collide, the second portion disappearing when the vehicle is closer than a third predetermined distance to the object of interest with which the vehicle may collide.

8. The system of claim 1, wherein the dynamic vehicle path line is generated using a homography matrix.

9. The system of claim 1, wherein a homography matrix is generated using a calibration procedure.

10. A method of assisting an operator of a vehicle in determining a distance between the vehicle and an object of interest with which the vehicle may collide, the method comprising:
    displaying an image on a vehicle display representative of a field of view from the vehicle;
    detecting by a controller the object of interest with which the vehicle may collide in the field of view;
    overlaying a dynamic vehicle path line on the displayed image, the dynamic vehicle path line having a first portion and a second portion, the first portion having a first color and the second portion having a second color different from the first color; and
    adjusting by the controller a length of the dynamic vehicle path line based on a distance between the vehicle and the object of interest with which the vehicle may collide such that the dynamic vehicle path line has a first length when the vehicle is greater than a first predetermined distance away from the object of interest with which the vehicle may collide, and has a linearly varying length, from the first length to zero based on a proportion of the distance the vehicle is away from the object of interest with which the vehicle may collide versus the first predetermined distance when the vehicle is less than the first predetermined distance away from the object of interest with which the vehicle may collide, wherein the dynamic vehicle path line does not overlay the image of the object of interest with which the vehicle may collide.

11. The method of claim 10, wherein adjusting the dynamic vehicle path line includes reducing the length of the dynamic vehicle path line as a distance between the vehicle and the object of interest with which the vehicle may collide becomes smaller.

12. The method of claim 10, further comprising determining the length of the dynamic vehicle path line using a homography matrix.

13. The method of claim 10, further comprising generating a homography matrix using a rectangular object positioned rear of the vehicle in the field of view.

* * * * *